US008032280B2

(12) United States Patent
Shibata et al.

(10) Patent No.: US 8,032,280 B2

(45) Date of Patent: Oct. 4, 2011

(54) SWITCH CONTROL DEVICE AND SWITCH CONTROL METHOD

(75) Inventors: Yumi Shibata, Okazaki (JP); Takayuki Miyajima, Okazaki (JP); Fumiharu Ogawa, Okazaki (JP)

(73) Assignee: Aisin Aw. Co., Ltd. (JP)

( * ) Notice: Subject to any disclaimer, the term of this patent is extended or adjusted under 35 U.S.C. 154(b) by 931 days.

(21) Appl. No.: 12/007,916

(22) Filed: Jan. 17, 2008

(65) Prior Publication Data

US 2008/0177440 A1 Jul. 24, 2008

(30) Foreign Application Priority Data

Jan. 23, 2007 (JP) ................................ 2007-013186

(51) Int. Cl.
*G06F 17/00* (2006.01)
*G06F 19/00* (2011.01)

(52) U.S. Cl. ............ 701/36; 701/31; 701/201; 345/173; 345/184; 307/10.8

(58) Field of Classification Search .................... 701/36; 345/184
See application file for complete search history.

(56) References Cited

U.S. PATENT DOCUMENTS 4,731,769 A 3/1988 Schaefer et al. .................. 369/6
4,787,040 A * 11/1988 Ames et al. ....................... 701/1
5,555,172 A * 9/1996 Potter ........................ 455/456.1
5,555,502 A * 9/1996 Opel ............................... 701/36
6,064,932 A * 5/2000 François ......................... 701/49
6,757,001 B2 * 6/2004 Allport ......................... 715/840
6,774,505 B1 * 8/2004 Wnuk .......................... 307/10.8
7,084,859 B1 * 8/2006 Pryor ............................ 345/173
7,126,583 B1 * 10/2006 Breed .......................... 345/158
7,755,472 B2 * 7/2010 Grossman .................. 340/426.1
7,802,198 B2 * 9/2010 Obradovich ................. 715/790
2003/0023353 A1 1/2003 Badarneh
2003/0214487 A1 * 11/2003 Morath ......................... 345/173
2008/0006296 A1 * 1/2008 Nagata et al. ..................... 134/6

FOREIGN PATENT DOCUMENTS

CN 1424968 6/2003
DE 10 2004 053950 A1 3/2006
DE 102004053950 * 3/2006
EP 0 675 018 A 10/1995
JP 2005-153684 6/2005
WO 2007/122479 A 11/2007

OTHER PUBLICATIONS

Chinese Search Report issued by Chinese Patent Office corresponding to Chinese Application No. CN 2008-10002755.X dated Nov. 24, 2010.

* cited by examiner

*Primary Examiner* — Thomas Black
*Assistant Examiner* — Lin B Olsen
(74) *Attorney, Agent, or Firm* — Bacon & Thomas, PLLC

(57) ABSTRACT

A control system controls a hardware switch which receives a usage command for utilizing an auxiliary function of a vehicle and a software switch displayed with an information portion indicating the auxiliary function and a command portion for input of the usage command through a screen. When either of the hardware switch or the software switch is operated, information is provided for identifying the other switch that corresponds to the auxiliary function commanded by the operated switch.

6 Claims, 7 Drawing Sheets

SWITCH CONTROL DEVICE AND SWITCH CONTROL METHOD

The disclosure of Japanese Patent Application No. 2007-013186 filed on Jan. 23, 2007 including the specification, drawings and abstract is incorporated herein by reference in its entirety.

BACKGROUND OF THE INVENTION

1. Technical Field

The present invention relates to a control system, a method and a program for controlling switches that operate auxiliary equipment provided in a vehicle.

2. Related Art

Diverse auxiliary functions provided in a vehicle, such as vehicle seat position adjustment and mirror angle adjustment, utilize various switches. Such switches include hardware switches for adjusting an auxiliary function through manual operation of a switch operator, and software switches in the form of a display image of a seat or a mirror on a touch display for operation of various auxiliary functions by touch (see Japanese Patent Application Publication No. JP-A-2005-153684 for an example).

SUMMARY OF THE INVENTION

Problem to be Solved by the Invention

With the related art, it is difficult to accurately see the position of the hardware switch and to determine the auxiliary function corresponding to the switch.

Hardware switches for vehicles are often provided at positions difficult for the driver to see, such as on the side of the seat or the lower portion of the dashboard. In such cases, it is difficult to find the position of the hardware switch and to operate the corresponding item of auxiliary equipment. Also, numerous auxiliary functions in the vehicle require a considerable number of hardware switches which contributes to the difficulty in accurately finding the location of a hardware switch and determining its corresponding function.

Furthermore, using a software switch through a touch display requires shifting the line of sight to a screen, switching screens, and the like. Accordingly, recognizing or operating the hardware switch while looking at the software switch displayed on the touch display is difficult. This in turn obviously leads to difficulties in clearly understanding the corresponding relationship between the hardware switch and the software switch.

The present invention was devised in view of the foregoing problems, and it is an object of the present invention to provide for accurately recognizing position of a hardware switch and a software switch corresponding to the hardware switch.

Means for Solving the Problem

In order to achieve the above object, the present invention provides a system wherein an auxiliary function provided in a vehicle may be operated by either a hardware switch or a software switch, and wherein when either the hardware switch or the software switch is operated, information is provided for identifying the other switch that corresponds to the auxiliary function utilized by the operated switch.

Thus, when a hardware switch is operated, information is provided for identifying the software switch that corresponds to the auxiliary function operated by the hardware switch. Also, the software switch is a display on a screen that includes both an information portion indicating the auxiliary function and an input (command) portion for input of a command to operate the auxiliary function. Accordingly, information is provided for identifying the software switch that corresponds to the operation of the hardware switch as described above, and the auxiliary function that corresponds to the hardware switch is clearly indicated on the screen. Therefore, an operator is informed of the auxiliary function (an operation of an item of auxiliary equipment) that can be commanded by operation of the hardware switch.

Likewise, when the software switch is operated by touch, information is provided identifying the hardware switch that corresponds to the auxiliary function commanded by operation of the software switch. With the display of the software switch as described above, the auxiliary function operated by the software switch is clearly indicated. Therefore, when using the software switch, the operator clearly understands the auxiliary function corresponding to the software switch.

By providing information identifying the hardware switch that corresponds to software switch, it is possible to accurately determine the position of that hardware switch for use in commanding the auxiliary function that corresponds to the software switch. Furthermore, by repeating this operation several times, the driver can come to remember the position of the appropriate hardware switch. Once the position is memorized, the auxiliary function can be easily utilized through the hardware switch, even when the software switch is not displayed, e.g. when the engine of the vehicle is stopped or not yet started.

Here, the hardware switch may be any switch capable of output of a usage command to operate the auxiliary function, responsive to physical operation with a digit or the like. For example, the hardware switch may be a switch operated by pressing, toggling, turning or moving a button, lever, knob, dial, or the like.

"Auxiliary functions" in the vehicle as used herein includes all functions of auxiliary equipment for which a usage command is input via a hardware switch and a software switch, such as position adjustment or angle adjustment of a steering wheel, seat adjustment, mirror adjustment, headrest adjustment, seat heater, driving position memory, air-conditioning, an audio function, and parking assist, as well as guidance by a navigation system.

The form of the software switch is not particularly limited, provided that information indicating the auxiliary function and the command input portion for input of a usage command can be clearly indicated on the screen. For example, the display of information indicating the auxiliary function, may be an icon or char or characters. Any structure may be used for the command input portion such as icons, characters or the like that indicate the auxiliary function (e.g. direction of seat movement when adjusting the seat position).

The command input portion of the software switch is not limited, and may be any of various structures including, for example image display on a touch panel, whereby touching of the command input portion inputs the command or a menu of commands, one of which can be selected by a cursor key, dial or the like found on the screen, and the command is input by selecting the desired command input portion.

On the above-mentioned screen, the display should include at least an image that corresponds to the software switch, and for this purpose the screen may be that of a navigation system or an instrument panel. An HUD or the like may also be utilized.

The switch-identifying information portion is not limited, provided that when either the hardware switch or the software switch for a certain auxiliary function is operated, the switch-identifying information portion provides information identifying the other switch for operating the auxiliary function, i.e. any information making the operator aware of the existence and/or location of the other switch. Various structures may be employed to provide such information through images, audio or the like, e.g. a screen on which a display of the switch is highlighted.

Various structures may be also employed to provide information identifying the hardware switch. For example, a light may be built into the operation portion of the hardware switch (switch operator) to indicate location of the hardware switch. Alternatively, the lighting structure light may be one which emits light around the hardware switch.

Any of a variety of display structures may be employed to provide information for identifying the software switch. For example, a plurality of software switches may be displayed on the screen, with the software switch corresponding to the auxiliary function for which a usage command was made highlighted in order to identify the software switch. Alternatively, a previously undisplayed software switch may be displayed on the screen in order to identify the software switch, responsive to a usage command. The display of the software switch is not limited, provided that the one software switch corresponding to the operated hardware switch is clearly indicated. In addition, either or both the information portion indicating the auxiliary function and the command input portion for input of the usage command for the auxiliary function may be displayed.

The present invention also provides a program and method for, when either the hardware switch or the software switch is operated, providing information for identifying the other switch. The switch control system, program, and method of the present invention may be embodied in various forms, e.g. as an individual (dedicated) switch control device, or as a function provided by a plurality of components in the vehicle. For example, it is possible to provide a navigation system, method, and/or program inclusive of the present invention. Furthermore, the present invention may be embodied in part as software and in part as hardware. The invention may also be embodied as a computer readable medium having encoded thereon a program that operates the switch control. The recording medium of such software may be a magnetic recording medium or a magneto-optic recording medium, or other machine (e.g. computer) readable medium.

DETAILED DESCRIPTION OF THE PREFERRED EMBODIMENTS

(1) Switch Control Device (System)

Figure 1:
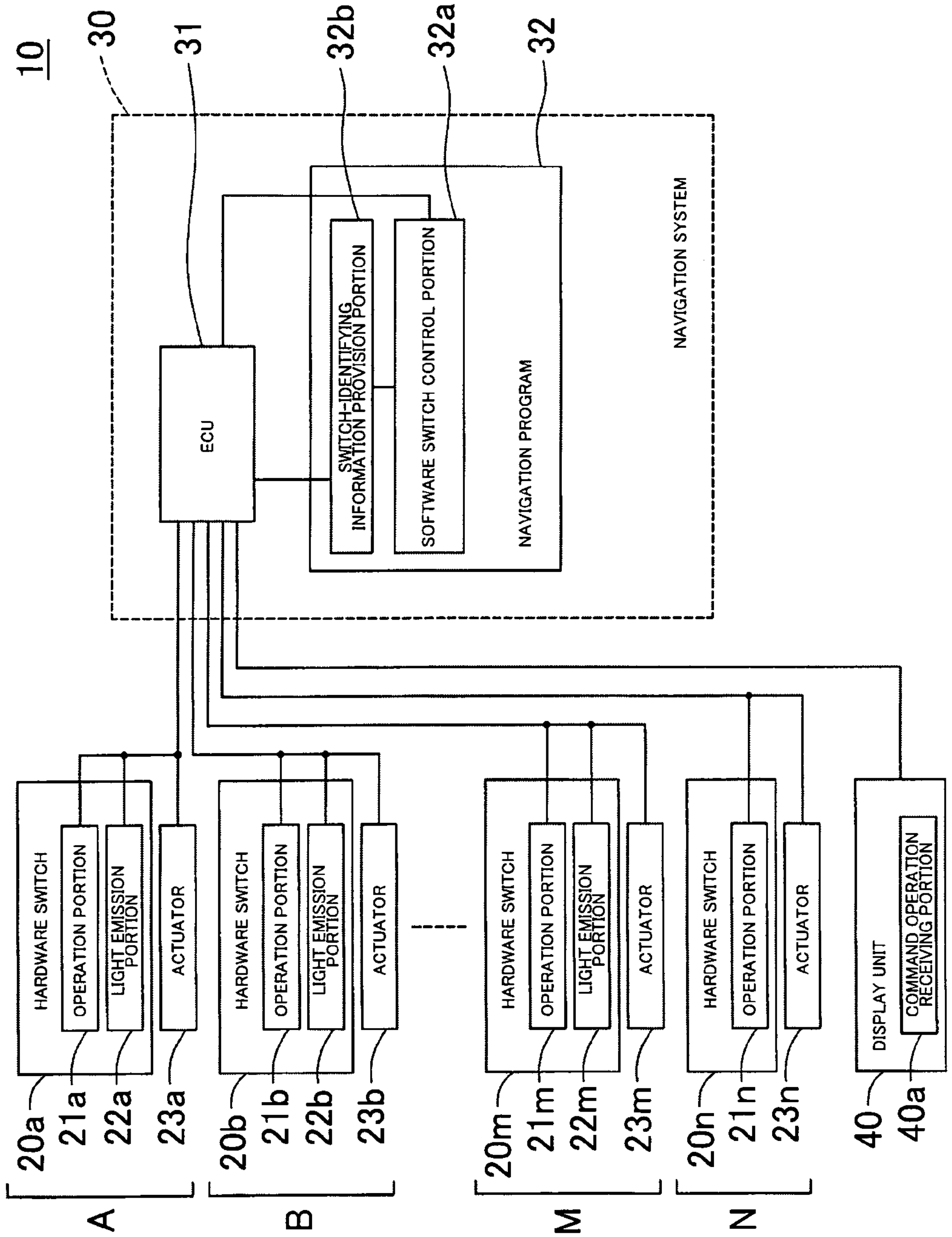
FIG. 1 is a block diagram showing the structure of an embodiment of a switch control device, in accordance with the present invention installed in a vehicle.

FIG. 1 is a block diagram which shows the structure of a switch control device 10 as including hardware switches 20*a*, 20*b* to 20*m*, 20*n*, actuators 23*a*, 23*b* to 23*m*, 23*n*, a navigation system 30, and a display unit 40, all mounted in a vehicle.

The hardware switches 20*a*, 20*b* to 20*m*, 20*n* are respectively paired with actuators 23*a*, 23*b* to 23*m*, 23*n* in order to operate various auxiliary devices in the vehicle. The display unit 40 is installed in the vehicle and includes a touch panel that accepts command operations through contact (touch) of the screen.

The navigation system 30 is a system that receives signals in a GPS receiver, contains map information stored in a recording medium, and executes navigation routines to guide the vehicle. The navigation system 30 includes the function of generating software switches, and the navigation system 30 is structured so as to execute a control routine for the switches. The navigation system 30 includes an ECU 31 that executes routines including a navigation program 32 and additionally software switches and switch control functions in accordance with an embodiment of the present invention.

The ECU 31 is connected with the hardware switches 20*a*, 20*b* to 20*m*, 20*n*, the actuators 23*a*, 23*b* to 23*m*, 23*n*, and the display unit 40 to provide control through an exchange of signals with the hardware switches the actuators and the display unit 40, and also obtains information from the various auxiliary devices.

More specifically, a plurality of auxiliary devices A, B to M, N are provided in the vehicle, which auxiliary devices are respectively operated by the hardware switches 20*a*, 20*b* to 20*m*, 20*n*, through the actuators 23*a*, 23*b* to 23*m*, 23*n*. The hardware switches 20*a*, 20*b* to 20*m*, 20*n* have light emission portions (lights) 22*a*, 22*b* to 22*m*.

The operation portions (hardware switch operators) 21*a*, 21*b* to 21*m*, 21*n* are mechanisms such as buttons, levers, knobs, and dials that allow physical operation by a digit or the like. By pressing, toggling, turning, or otherwise operating such mechanisms, commands can be given to operate the various items of auxiliary equipment on the vehicle. In other words, operation of one of the switch operators 21*a*, 21*b* to 21*m*, 21*n* results in the output of a signal to the ECU 31 which recognizes the signal as commanding a specified operation of a specific item of auxiliary equipment.

Lights 22*a*, 22*b* to 22*m* are incorporated into the respective switch operators 21*a*, 21*b* to 21*m*, and emit light in response to a signal output by the ECU 31. Accordingly, when one of the lights 22*a*, 22*b* to 22*m* is activated responsive to the signal from EUC 31 light is output from the corresponding switch operator and the driver can easily find the location of the switch operator among 21*a*, 21*b* to 21*m* for which the light has been activated.

The actuators 23*a*, 23*b* to 23*m*, 23*n* are mechanisms that perform specified physical movements to operate the auxiliary equipment installed in the vehicle in response to signals output by the ECU 31. For example, a seat installed in the vehicle includes functions of actuators for reclining, moving the seat surface forward and backward, moving the seat upward and downward, adjusting the seat angle, and the like, i.e. for adjusting position of those portions of the seat which are movable. Hence, the actuators 23*a*, 23*b* to 23*m*, 23*n* are incorporated into these respective movable portions, and the respective movable portions are repositioned by driving the actuators under the control of the ECU 31.

The actuators for vehicle auxiliary equipment controlled in accordance with the present invention may also be, for example, the actuators which generate forward and backward movement and upward and downward movement of a steering wheel, and those which provide angle adjustment of a door mirror. Furthermore, the hardware switch 20*n* need not include a light and need not have a corresponding software switch (e.g. a switch to open a trunk).

Figure 2:
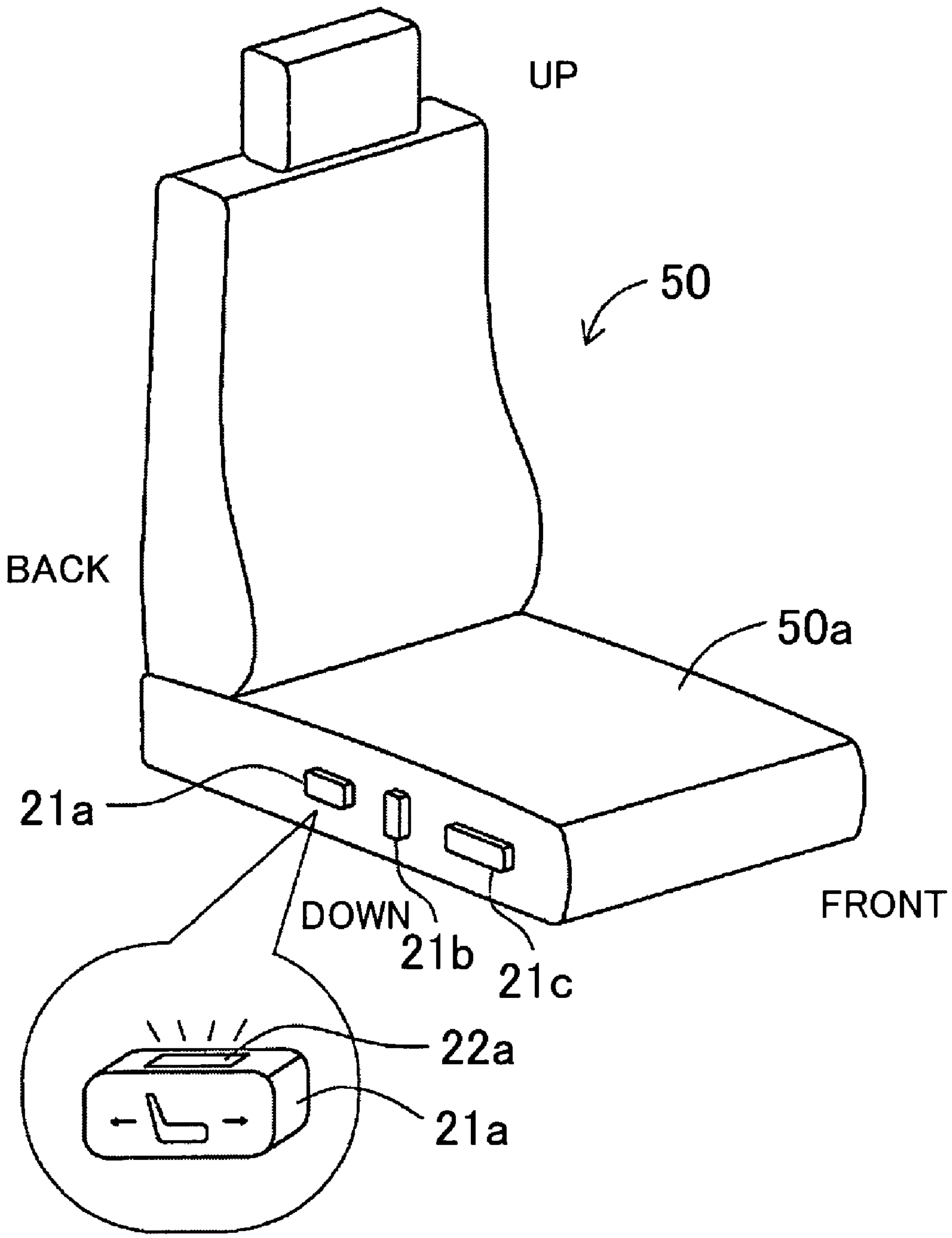
FIG. 2 is a schematic view of one example of a hardware switch in accordance with the present invention.

FIG. 2 shows seat 50 having a plurality of hardware switch operators 21*a*, 21*b*, 21*c* on a side surface 50*a*. Reclining, moving the seat surface 50*a* forward and backward, moving the seat 50 upward and downward, and seat angle adjustment can all be performed through use of the respective switch operators 21*a*, 21*b*, 21*c*. FIG. 2 additionally shows an expanded view of the switch operator 21*a*.

The switch operator 21*a* on the side surface 50*a* of the seat is in the form of a generally rectangular projection. Pressing the front side of the switch operator 21*a* gives a command to move the seat surface 50*a* forward, while pressing the rear side of the switch operator 21*a* gives a command to move the seat surface 50*a* backward. More specifically, by pressing the front side of the switch operator 21*a*, a signal is output to the ECU 31, and in response, the ECU 31 outputs a signal for moving the seat surface 50*a* forward. The actuator 23*a* is then driven to move the seat surface 50*a* forward in response to the signal output by the ECU 31.

The light 22*a* is incorporated inside the switch operator 21*a*. Based on a command from switch-identifying information provision portion (switch-identifying means) 32*b*, the ECU 31 outputs a signal for lighting the light 22*a*. When this happens, the light 22*a* emits light and thereby provides information (optical output) identifying the switch operator 21*a* and indicating its location to the driver to the driver. Note that in the present embodiment, the movable (repositionable) equipment A, B to M also include the steering wheel and the door mirrors in addition to the seat 50.

Meanwhile, in the present embodiment, the software switch is realized by a software switch control portion (software switch control means) 32*a* provided in the navigation program 32, the ECU 31, and the display unit 40. The ECU 31 runs the software, i.e. switch control portion 32*a*. By execution of the routine for the software switch control portion 32*a*, a signal is output to the display unit 40 for displaying (1) an information portion that indicates the operation of one of the movable portions A, B to M and (2) a command portion for input of a command to execute the operation.

In the present embodiment, the display unit 40 includes a command operation receiving portion 40*a*, and is capable of detecting contact of the screen by a digit or the like. Namely, the command operation receiving portion 40*a* is structured so as to detect the region or position (location) where a digit or the like contacts the screen, and to output a signal indicating the position of such contact which signal is received by the ECU 31. Accordingly, the ECU 31 receives a command for an operation, e.g. repositioning of one of the movable portions A, B to M, by touch operation of one of the above-mentioned command portions.

When the ECU 31 receives a command for operation of one of the movable portions (components) A, B to M, the software switch control portion 32*a* identifies the movable portion A, B to M for which the operation command is targeted, and outputs a signal for driving the corresponding actuator 23*a*, 23*b* to 23*m*. Accordingly, the movable portion specified by touch of the display unit 40 is driven by the corresponding actuator.

Figure 3:
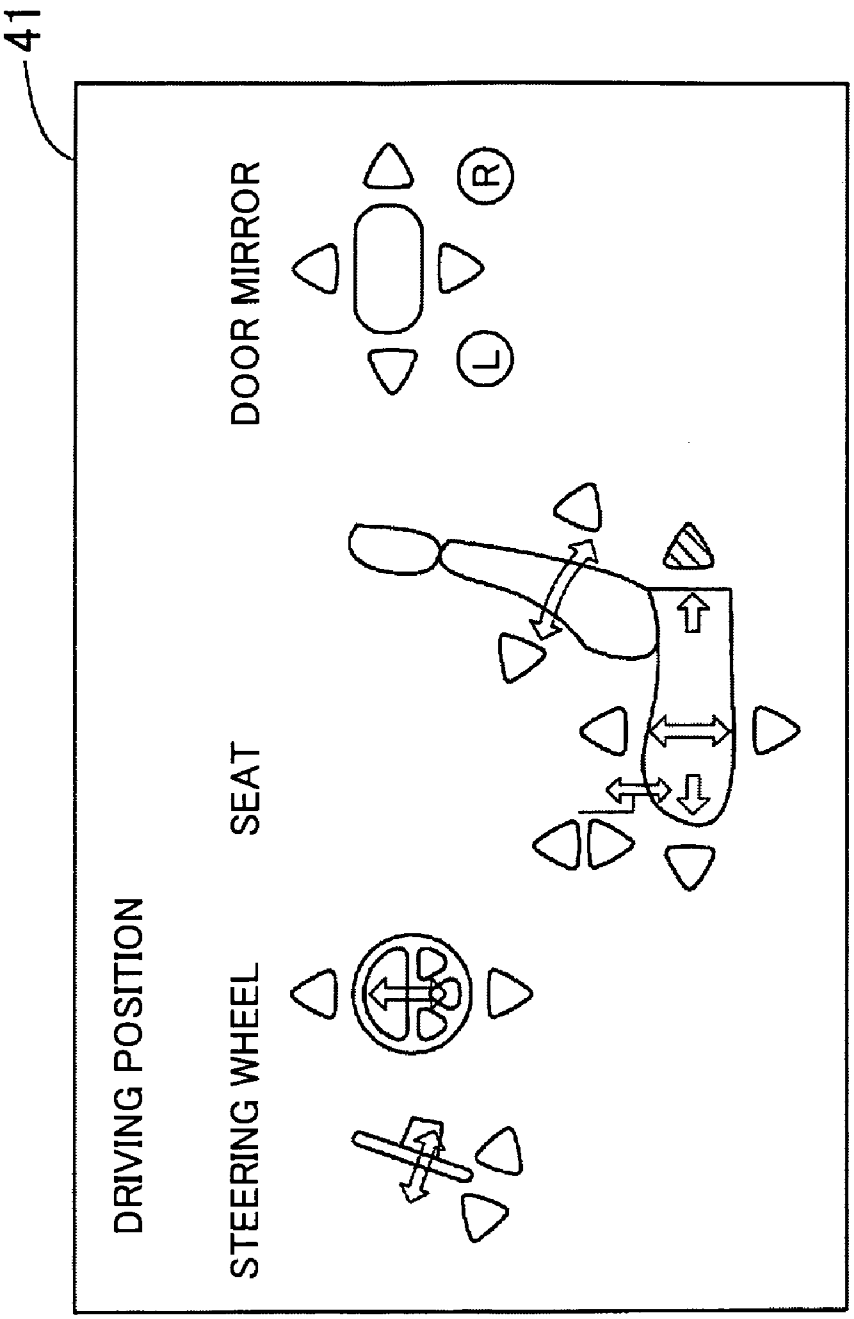
FIG. 3 depicts one example of a software switch.

FIG. 3 shows an example of a screen display 41 with software switches for operating the steering wheel, the seat, and the door mirror, representative of items of auxiliary equipment A, B to M of the vehicle. In addition to images indicating the steering wheel, the seat, and the door mirror, arrow images indicating various operations are also displayed on screen 41. Furthermore, command portions for operation of the mobile portions of auxiliary equipment are displayed as triangular images, and output usage commands responsive to touch. Accordingly, when the driver touches a triangular shape displayed on the screen 41, the actuator corresponding to the touched triangular image, e.g. for the steering wheel, seat, or door mirror, is driven so as to achieve the commanded operation.

In the present embodiment, the operation portion (switch operator) of the hardware switch is attached to the side surface 50*a* of the seat 50, as described above. However, not all drivers (particularly drivers driving the vehicle for the first time) may be able to immediately find the proper hardware switch. Furthermore, the vehicle in the present embodiment is provided with a plurality of items of auxiliary equipment having movable portions, and a plurality of hardware switches. Therefore, it is difficult for the driver to accurately determine the function of each switch. Hence, according to the present invention, the switch-identifying information provision portion (means) 32*b* is provided in the navigation program 32, and the position and function of the hardware switch are clearly shown by execution of the routine described below.

(2) Switch Control Processing

While executing the navigation program 32, the ECU 31 is capable of running the proper software switch control portion 32*a* in accordance with the driver's command and of controlling operation of a function of auxiliary equipment through a software switch. In addition, the movable portions of the auxiliary equipment can be operated through manipulation the hardware switches 20*a*, 20*b* to 20*m*, 20*n* when the ECU 31, the actuators and the like are activated by supply of electric power.

Figure 4:
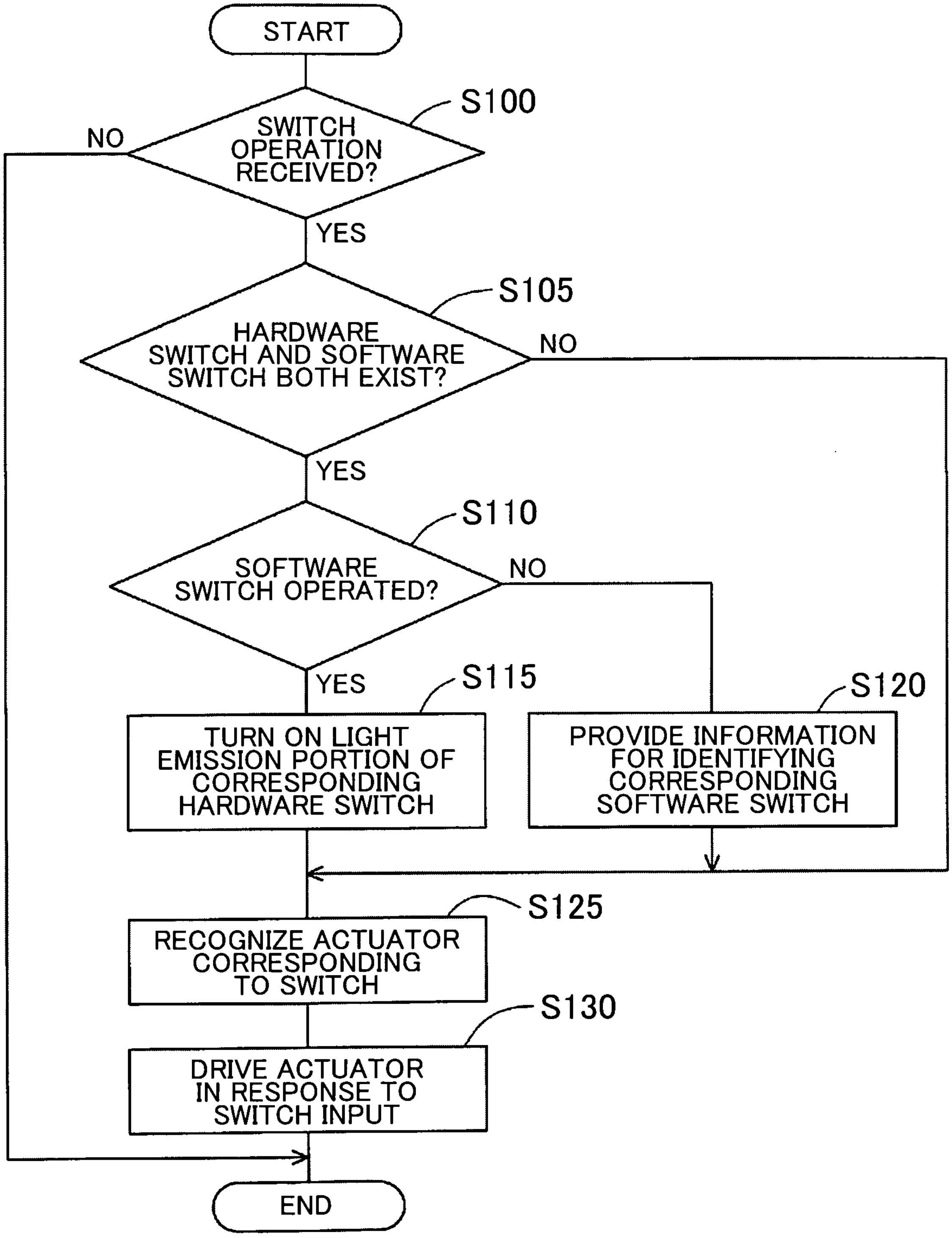
FIG. 4 is a flowchart of an embodiment of a method in accordance with the present invention.

The switch-identifying information provision portion 32*b* of the ECU 31 executes the routine shown in FIG. 4, and determines whether an operation command has been received (step S100). Namely, the ECU 31 determines whether or not an operation command from a software switch (a signal output by the display unit 40) or an operation command from a hardware switch (a signal output by manipulation of a switch operator) has been received.

If it is determined that a command signal generated by switch operation has been received in step S100, then the ECU 31 determines whether both a hardware switch and a software switch exist for operating the movable portion of equipment corresponding to the received command signal (step S105). If it is determined at step S105 that both a hardware switch and a software switch exist, then the ECU 31 determines whether the operated switch is the software switch (step S110).

If it is determined at step S110 that the software switch was operated, then the ECU 31 turns on the light of the hardware switch corresponding to the software switch (step S115). In other words, since the movable portion to be operated is identified by the signal the ECU 31 receives from the display unit 40, the ECU 31 outputs a signal for turning on the light of the hardware switch which operates the thus identified movable portion.

If it is determined at step S10 that the hardware switch was operated, then the ECU 31 provides information for identifying the software switch corresponding to the hardware switch on the screen of the display unit 40 (step S120). In other words, since the movable portion to be operated is identified by the signal the ECU 31 receives from of the hardware switch, the ECU 31 outputs a signal for displaying information for identifying the software switch for that movable portion to the display unit 40.

While software switches such as shown in FIG. 3 need not all be displayed on the display unit 40, at least the software switch corresponding to the operated hardware switch is displayed on the screen. When plural software switches such as shown in FIG. 3 are displayed on the display unit 40, then the software switch corresponding to the operated hardware switch is displayed highlighted. For example, in cases where plural software switches such as shown in FIG. 3 are displayed, manipulation of the hardware switch operator 21*a* to move the seat surface backward is accompanied by highlighting such as hatching of the triangular command portion corresponding to the manipulated hardware switch, on the screen of the display unit 40.

If it is determined at step S105 that either the hardware switch or the software switch does not exist, then the processing skips steps S110 to S120. Thus, according to the present embodiment, if a movable component of auxiliary equipment is provided with only one of a hardware switch and a software switch, such as the movable portion of auxiliary equipment N shown in FIG. 1, then the location (position) and function of the hardware switch cannot be shown. Hence, steps S10 to S120 are skipped, and processing is performed to provide information that identifies the other switch for operating the movable portion.

By executing the routine of FIG. 4, the ECU 31 recognizes the actuator corresponding to the switch for which an operation command was received at step S100 (step S125), and drives that recognized actuator (step S130). More specifically, the ECU 31 outputs a signal for driving the actuator corresponding to the operated switch, and the actuator drives the movable portion in response to that signal.

As described above, when a software switch is operated, for example, when a command to move the seat surface of the seat backward is made using the command portion with hatching shown in FIG. 3, the seat surface of the seat is moved backward in steps S125, S130. At this time, the light 22*a* in the switch operator 21*a* of the corresponding hardware switch is turned on. To operate the software switch, the driver is guided by the display of the display unit 40. The seat surface as the movable portion and moving backward as the commanded function are thus easily understood.

In the present embodiment, because the hard switch operator 21*a* is indicated by the light, it is easily recognized as the switch for moving the seat surface backward. Thus, by repeating this operation at least once, or as many times as necessary, the driver can remember the location of the hardware switch for moving the seat surface backward. Once the location is memorized, the auxiliary function can be easily utilized through the hardware switch, regardless of whether the software switch is displayed, even when the engine of the vehicle is stopped or not yet started.

Also, when a hardware switch is operated, for example, when the switch operator 21*a* shown in FIG. 2 is pressed to move the seat surface backward while the software switch shown in FIG. 3 is displayed on the display unit 40, then the triangular command portion shown in FIG. 3 of the software switch for moving the seat surface backward is highlighted by hatching or the like on the screen of the display unit 40. Thus, even in cases where the driver operates the switch operator 21*a* without clearly understanding the equipment controlled by the switch operator 21*a*, by viewing the screen of display unit 40 the driver can easily learn that the seat surface is that movable component which is controlled by operation of 21*a* and that the command is to move the seat surface backward.

(3) Other Embodiments

The above described embodiment is but one example of the present invention. Variations thereof may be adopted provided that when either the hardware switch or the software switch is operated, information is provided identifying the other, corresponding switch. For example, while the ECU 31 performs a plurality of switch controls in the embodiment described above, a plurality of ECUs may be employed to perform the plurality of switch controls.

Figure 5:
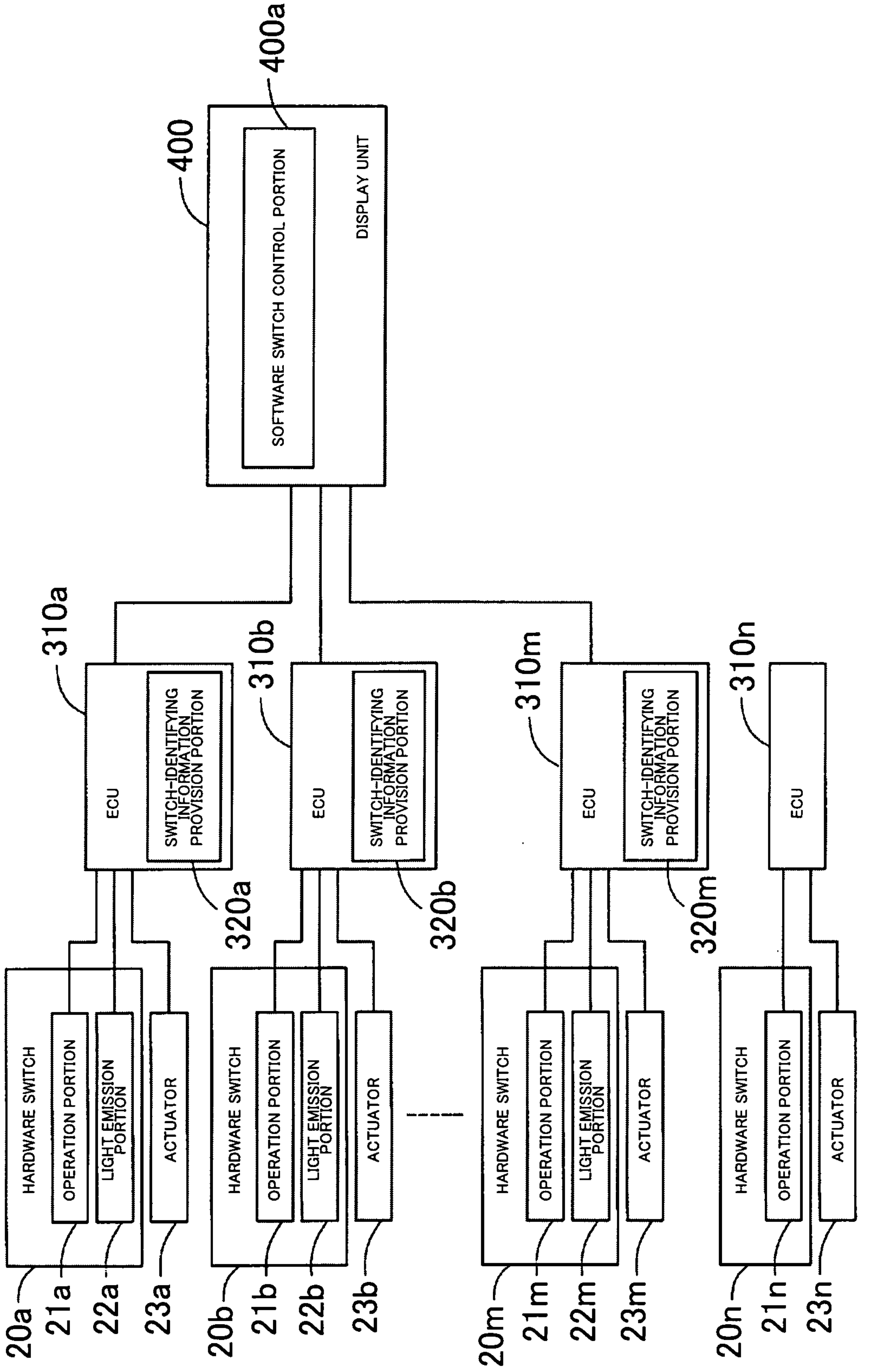
FIG. 5 is a block diagram of another embodiment of the switch control device of the present invention.

FIG. 5 is a block diagram showing another embodiment of a switch control system for a vehicle, which is provided with plural ECUs respectively corresponding to a plurality of switches. In FIG. 5, elements identical to those shown in FIG. 1 are indicated by the same reference numerals. In the embodiment of FIG. 5, the switch operators 21*a*, 21*b* to 21*m* and the lights 22*a*, 22*b* to 22*m* of the hardware switches 20*a*, 20*b* to 20*m* and the actuators 23*a*, 23*b* to 23*m* are respectively connected to ECUs 310*a*, 310*b* to 310*m*.

In other words, the ECUs 310*a*, 310*b* to 310*m* are capable of driving the actuators based on the operation of the hardware switch operators, and also capable of turning on the lights in response to signals output from a display unit 400. When a hardware switch operator is operated, it is also possible to output a signal indicating the operated hardware switch to the display unit.

ECUs 310*a*, 310*b* to 310*m* are connected to the display unit 400 and, in the display unit 400, various programs can be executed by an ECU to display various images. In the embodiment of FIG. 5, the software switch control ECU portion 400*a* operates to generate a software switch. More specifically, an operation command corresponding to the movable equipment portion to be operated is received by an interface similar to that shown in FIG. 3 and a signal indicating the operation command is output to the ECU connected to the corresponding actuator. Note that a hardware switch 20*n* is a switch for operating a movable auxiliary equipment portion for which provision of a software switch is not assumed. Although the hardware switch 20*n* is controlled by an ECU 310*n*, the ECU 310*n* is not connected to the display unit 400.

Figure 6:
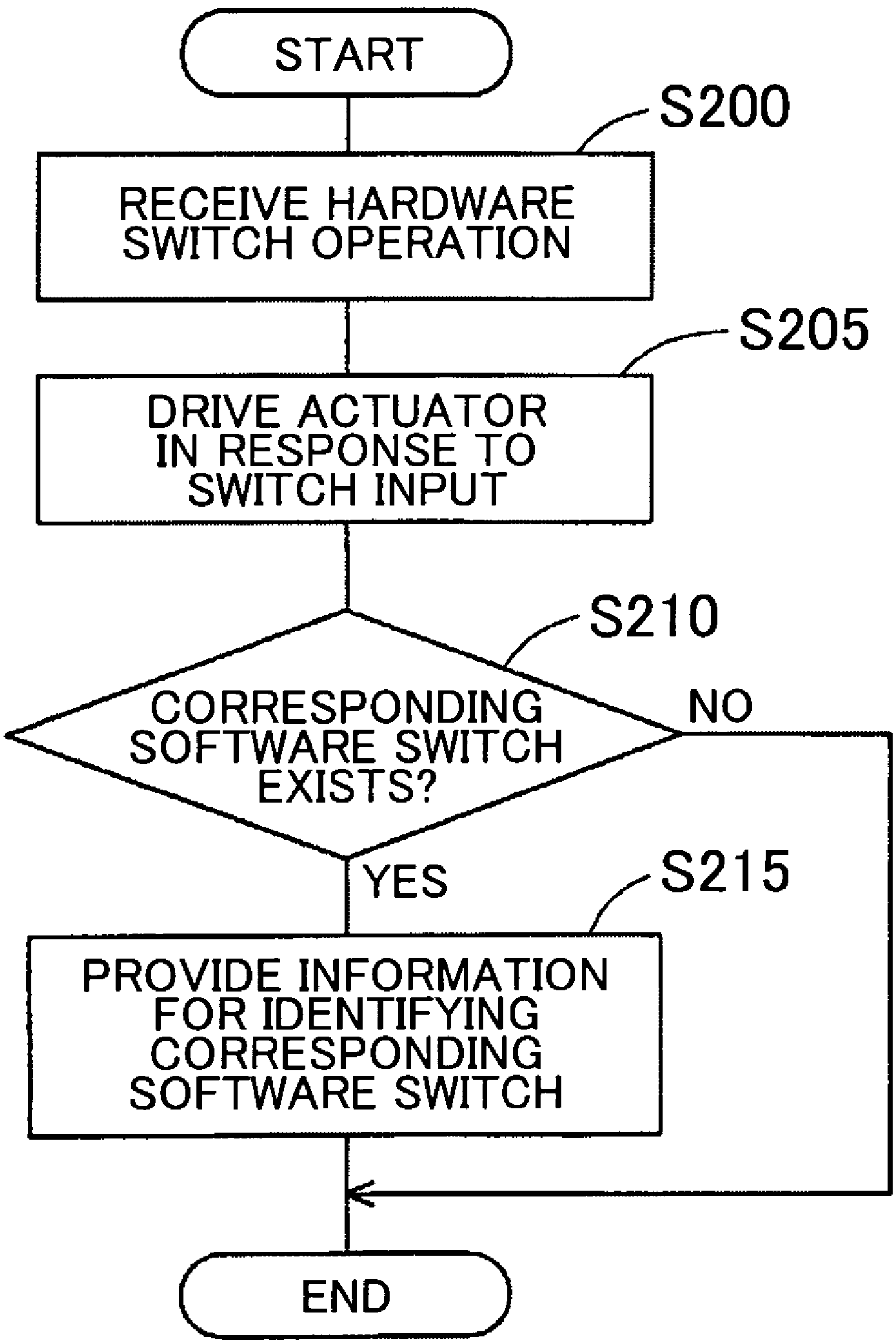
FIG. 6 is a flowchart of an embodiment of a switch control routine in accordance with the present invention.
Figure 7:
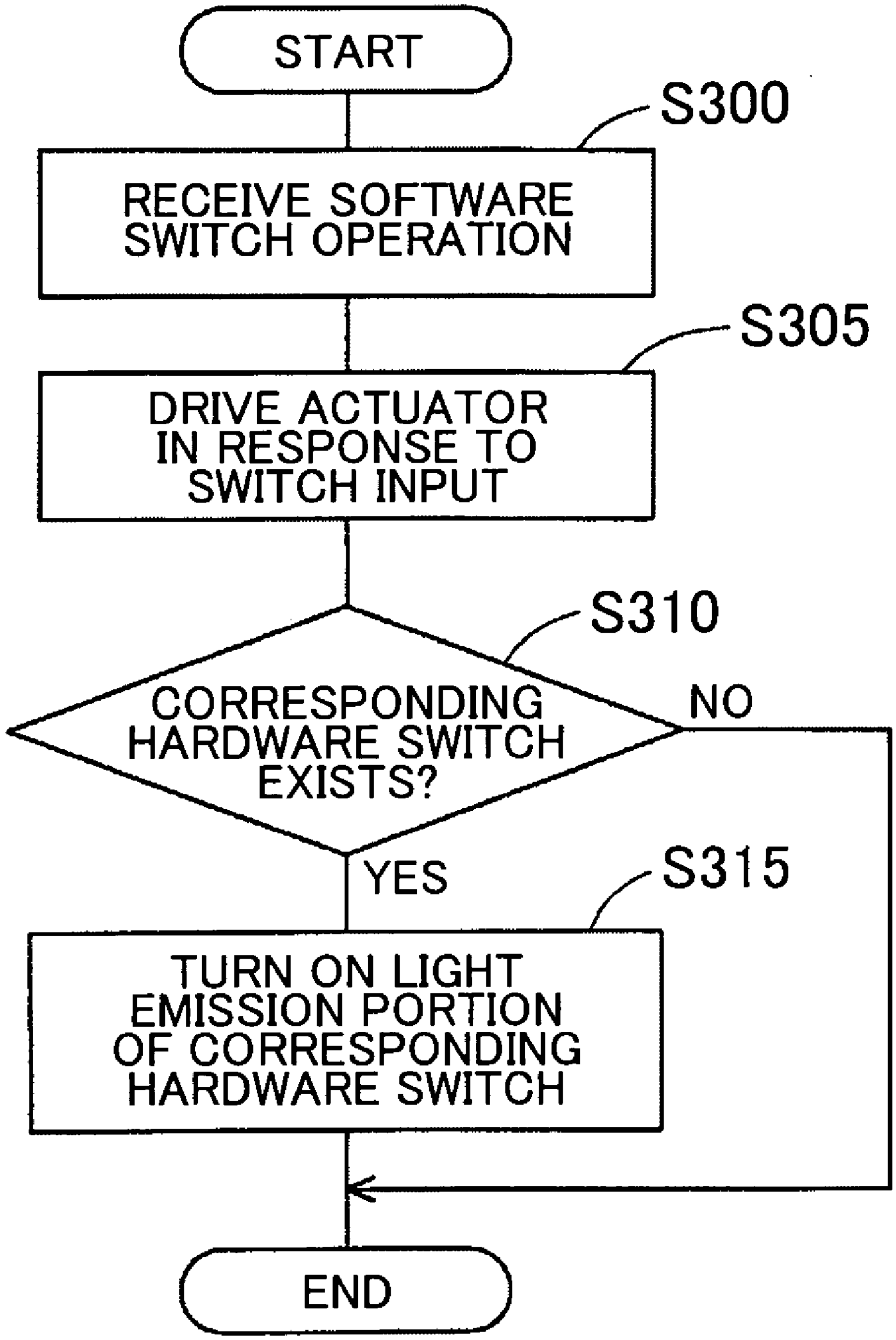
FIG. 7 is a flowchart of another embodiment of a switch control routine.

The ECUs 310*a*, 310*b* to 310*m* include switch-identifying information provision sections (means) 320*a*, 320*b* to 320*m* for indicating the location and function of the hardware switch. FIGS. 6 and 7 are flowcharts of the processing performed by the switch-identifying information provision sections 320*a*, 320*b* to 320*m*.

When one of the switch-identifying information provision sections 320*a*, 320*b* to 320*m* receives an operation command from a hardware switch (step S200), the corresponding actuator is driven (step S205), and it is determined whether a corresponding software switch exists (step S210). If it is determined at step S210 that a corresponding software switch exists, then information identifying the software switch is provided on the screen of the display unit 400 (step S215). Accordingly, it is possible to easily identify the equipment which is to be operated and the operation which is commanded by the operated hardware switch.

Meanwhile, if an operation command is received from a software switch (step S300), then the corresponding actuator is driven (step S305) and it is determined whether a corresponding hardware switch exists (step S310). If it is determined at step S310 that a corresponding hardware switch exists, then the light associated with the hardware switch is turned on (step S315) enabling the driver to easily recognize and remember the location of the hardware switch.

Furthermore, according to the embodiment of FIG. 5, the subject of the switch operation is a movable portion of equipment such as the steering wheel, seat, or mirror. However, the subject of the operation is not limited to a movable portion of such equipment and the present invention is applicable to all switches that give usage commands to utilize an auxiliary function in the vehicle. For example, the present invention can be applied to switches that operate position adjustment function or an angle adjustment function of a headrest or the like, a seat heater function, a driving position memory function, an air-conditioning function, an audio function, and a parking assist execution command function, or a guidance execution command function of a navigation system.

While the above example concerned a switch provided in the driver's seat, the present invention may also be applied to a switch that operates a movable portion of a passenger seat or a rear seat.

In addition, the form of the software switch shown in FIG. 3 is but one example. Various other forms may be employed including display of an icon to indicate the auxiliary function associated with the switch or display of characters to indicate the auxiliary function. Any structure may be used for the command portion as well, provided that it allows for input of a usage command for the auxiliary function. In addition to the example of a command portion in the form of an icon shaped as a triangle or the like as shown in FIG. 3, the command portion may be a display of characters or the like that indicate of the auxiliary function, e.g. seat movement direction when adjusting the seat position.

Naturally when providing information for identifying the software switch, it should be possible to clearly indicate the subject function to be operated by the switch. Therefore, in addition to the above-described structure in which the triangular command portion is highlighted, a structure highlighting information indicating the auxiliary function may include both a seat icon and an arrow overlapping the seat icon. Alternatively, a structure highlighting information indicating the auxiliary function may be adopted.

When the hardware switch is operated without a corresponding software switch displayed on the screen, various forms may be employed as a structure for displaying the software switch corresponding to the hardware switch on the screen. Namely, the software switch may be displayed on the screen as a structure providing information indicating the auxiliary function that corresponds to the operated hardware switch. Alternatively, that function may be realized by a display of the command portion on the screen in cases where the auxiliary function is identifiable by the command portion for input of the usage command for the auxiliary function. Of course that may be realized by a combination of the foregoing two types of display.

Moreover, the command operation input for the software switch is not limited to a structure wherein such input is performed by touching a touch panel. Various other structures may be employed, including a cursor key, dial or the like on the screen.

On the screen of the display unit 40 should be displayed at least an image that serves as a software switch. However an image display mechanism such as an instrument panel, a HUD or the like may also be utilized.

According to the above embodiment, information identifying the hardware switch is in the form of a light incorporated into or around the hardware switch operator. Alternatively, information identifying the hardware switch may in another form providing information which makes a driver aware of the existence and location of the hardware switch. For example, the location of the switch may be indicated through images, audio or the like, with the hardware switch illuminated by a light provided around the hardware switch.

The invention may be embodied in other specific forms without departing From the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A switch control system for controlling operation of a movable portion of auxiliary equipment in a vehicle, comprising:

a hardware switch including a switch operator which is manually operable to generate a usage command for operating the movable portion of the auxiliary equipment;

a software switch, displayed on a screen, the display of the software switch including an information portion indicating the movable portion of the auxiliary equipment and a command portion for manual input of a usage command through the screen; and switch-identifying information provision means for, responsive to operation of the hardware switch, providing information identifying the software switch that corresponds to the movable portion of the auxiliary equipment to be operated responsive to the usage command generated by operation of the hardware switch, and for, responsive to operation of the software switch, providing information identifying the hardware switch that corresponds to the movable portion of the auxiliary equipment to be operated responsive to the usage command generated by operation of the software switch; and wherein the switch identifying information provision means, responsive to operation of the hardware switch, displays on the screen (1) an image indicating the movable portion of the auxiliary equipment to be operated in accordance with the usage command generated by operation of the hardware switch, (2) an arrow image indicating operation of the movable portion of the auxiliary equipment to be operated by the hardware switch, and (3) the command portion of the software switch for operation of the movable portion of the auxiliary equipment to be operated in accordance with the usage command generated by operation of the hardware switch; and wherein the switch-identifying information provision means, responsive to operation of the hardware switch, highlights the command portion of the software switch corresponding to the operation of the movable portion of the auxiliary equipment to be operated in accordance with the usage command generated by operation of the hardware switch.

2. The switch control system according to claim 1, wherein the hardware switch includes a light associated with the switch operator, and the switch-identifying information provision means turns on the light responsive to operation of the software switch.

3. A switch control method for controlling a hardware switch and a software switch, both of which are operable to generate usage commands for operation of the same movable portion of auxiliary equipment in a vehicle, the switch control method comprising:

displaying, on a screen, the software switch, the display of the software switch including an information portion indicating the movable portion of the auxiliary equipment and a command portion for manual input of a usage command through the screen;

responsive to operation of the hardware switch, outputting a usage command for operation of the movable portion of the auxiliary equipment; and displaying (1) an image indicating the movable portion of the auxiliary equipment to be operated in accordance with the usage command generated by operation of the hardware switch, (2) an arrow image indicating operation of the movable portion of the auxiliary equipment to be operated by the hardware switch, and (3) the command portion of the software switch for operation of the movable portion of the auxiliary equipment to be operated in accordance with the usage command generated by operation of the hardware switch; and highlighting the command portion of the software switch corresponding to the operation of the movable portion of the auxiliary equipment to be operated in accordance with the usage command generated by operation of the hardware switch; and responsive to operation of the software switch, outputting a usage command for operation of the movable portion; and providing information identifying the hardware switch corresponding to the movable portion to be operated in accordance with the usage command generated by operation of the software switch.

4. The switch control method according to claim 3 further comprising:

responsive to operation of the software switch, turning on a light associated with a switch operator of the hardware switch, thereby providing information identifying a location of the hardware switch.

5. A computer-readable medium having, encoded thereon, a switch control program for controlling a hardware switch and a software switch, both of which are operable to generate usage commands for operation of the same movable portion of auxiliary equipment in a vehicle, the switch control program comprising:

displaying the software switch, on a screen, the display of the software switch including an information portion indicating the movable portion and a command portion for manual input of a usage command through the screen;

responsive to operation of the hardware switch, outputting a usage command for operation of the movable portion of the auxiliary equipment; and displaying (1) an image indicating the movable portion of the auxiliary equipment to be operated in accordance with the usage command generated by operation of the hardware switch, (2) an arrow image indicating operation of the movable portion of the auxiliary equipment to be operated by the hardware switch, and (3) the command portion of the software switch for operation of the movable portion of the auxiliary equipment to be operated in accordance with the usage command generated by operation of the hardware switch; and highlighting the command portion of the software switch corresponding to the operation of the movable portion of the auxiliary equipment to be operated in accordance with the usage command generated by operation of the hardware switch; and responsive to operation of the software switch, outputting a usage command for operation of the movable portion; and providing information identifying the hardware switch corresponding to the movable portion to be operated in accordance with the usage command generated by operation of the software switch.

6. A computer-readable medium according to claim 5, wherein the encoded switch control program further comprises:

responsive to operation of the software switch, activating a light associated with a switch operator of the hardware switch, thereby providing information identifying the location of the hardware switch.

* * * * *